United States Patent [19]

Birkin

[11] 3,737,577

[45] June 5, 1973

[54] COMMUNICATION SYSTEMS FOR RECEIVING AND CHECKING REPEATEDLY TRANSMITTED MULTI-DIGITAL TELEGRAMS

[75] Inventor: Michael Sambrook Birkin, Derby, England

[73] Assignee: British Railways Board, London, England

[22] Filed: Oct. 22, 1971

[21] Appl. No.: 191,701

[52] U.S. Cl...............................178/23 A, 340/172.5

[51] Int. Cl..........................................H04l 1/08

[58] Field of Search...........340/146.1 AG, 146.1 AC, 340/146.1 AB; 178/23 A; 235/153

[56] References Cited

UNITED STATES PATENTS

| | | | |
|---|---|---|---|
| 3,245,040 | 4/1958 | Burdett et al. | 340/146 |
| 3,150,350 | 9/1964 | Goldman | 235/153 |
| 3,303,482 | 2/1967 | Jenkins | 340/146 |
| 3,159,811 | 6/1961 | James et al. | 178/23 |
| 3,335,402 | 4/1963 | Deeg | 340/146 |

*Primary Examiner*—Kathleen H. Claffy
*Assistant Examiner*—Kenneth Richardson
*Attorney*—Elliott I. Pollock, Fred C. Philpitt, George Vande Sande et al.

[57] ABSTRACT

In a communication system in which information is conveyed as a repeatedly transmitted digital telegram, telegram checking equipment is provided at a receiving station. The checking equipment comprises a plurality of serially connected shift registers each having a number of stages with respective outputs corresponding to the number of information bits of the track telegram so that the information content of one telegram transmission in one shift register is checked against the information content of a sequentially transmitted telegram in another shift register. Logic circuitry is provided to ensure that if the information contents of sequentially transmitted telegrams do not check correctly a telegram is not allowed to pass beyond the checking equipment.

5 Claims, 4 Drawing Figures

COMMUNICATION SYSTEMS FOR RECEIVING AND CHECKING REPEATEDLY TRANSMITTED MULTI-DIGITAL TELEGRAMS

BACKGROUND OF THE INVENTION

This invention relates to communication systems in which information is conveyed in digital code in the form of repeated digital telegram. The receiving station may for example be on a moving vehicle.

The invention is more particularly, but not exclusively, applicable to track to train communication systems in which information is passed from the track to the train, and/or from the train to the track.

In track to train communication systems, information in the form of a digital telegram is conveyed for example from a trackside transmitter to a train in order to control the running of the train by giving command signals to the train driver or by automatically actuating the train control gear. The information may be relayed from the transmitter through conductors laid along the track and which become inductively coupled with aerial means on the train, the aerial means in turn feeding receiving equipment on the train. The track telegram may have for example an information content which is used by equipment on the train to calculate the maximum permissible speed of the train for presentation to the train driver as a visual display.

The object of this invention is to provide a simple, reliable telegram checking equipment for the information content of a digital telegram to ensure with high security that a valid telegram has been received before its information content is disseminated.

SUMMARY OF THE INVENTION

According to this invention there is provided in a communication system in which information is conveyed in digital code in the form of a repeatedly transmitted digital telegram, checking equipment through which the telegrams are passed sequentially at a receiving station and comprising a plurality of serially connected shift registers each having a number of stages with respective outputs corresponding to the number of information bits of the digital telegram so that each stage of one said shift register and the corresponding stage of another said shift register produce outputs related to the corresponding information bits of sequentially transmitted telegrams, and logic circuit elements to each of which the corresponding outputs of the shift registers are connected, such that if there is a disparity between corresponding outputs, passing of the track telegram to beyond the checking equipment is prevented.

In order to prevent malfunctioning caused by sticking of the checking equipment "A.C. - only" devices may be provided so that in the event of an A.C. voltage derived from the electric pulses constituting the track telegram not being produced a fail-safe condition prevails.

BRIEF DESCRIPTION OF THE DRAWINGS

In order that the invention may be readily understood, one form of track to train communication system embodying checking equipment in accordance with the invention will now be described by way of example with reference to the accompanying diagrammatic drawings, in which.

DESCRIPTION OF THE PREFERRED EMBODIMENTS

Figure 4:
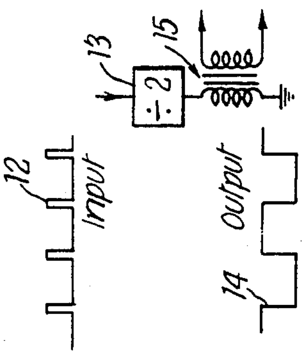

FIG. 4 shows a circuit diagram of an "A.C. -only" device.

Figure 1:
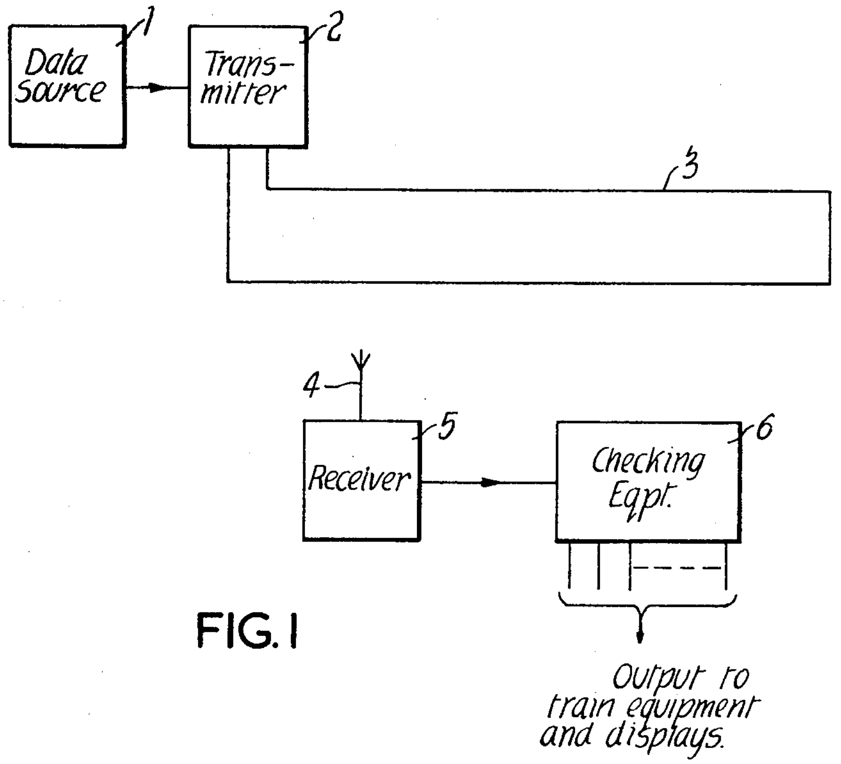
FIG. 1 is a schematic representation of the track to train communication system.

The track to train control system shown in FIG. 1 comprises a central station providing a digital data source 1 feeding a transmitter 2. The transmitter 2 repeatedly transmits a digital track telegram into a conductor loop 3 laid along the track as an open-wire transmission line. During the passage of a train over the conductor loop 3, aerial means 4 on the train becomes inductively coupled with the conductor loop 3 and so picks up the track telegram and feeds it to receiver 5 on the train. The receiver 5 feeds the telegram checking unit 6 with the digital track telegram. After checking, the track telegram is fed to the train equipment and driver's displays as appropriate.

Figure 2:
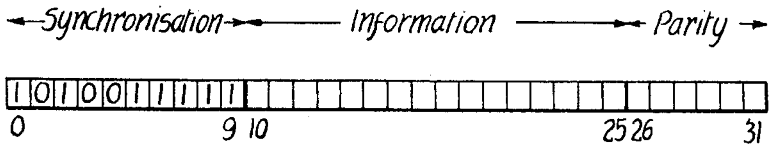
FIG. 2 shows a typical track telegram format.

For the purposes of this description it will be assumed that the track gelegram has 32 bits. The format of the track telegram is shown in FIG. 2 and comprises 10 synchronization bits, 16 information bits and 6 parity bits.

Figure 3:
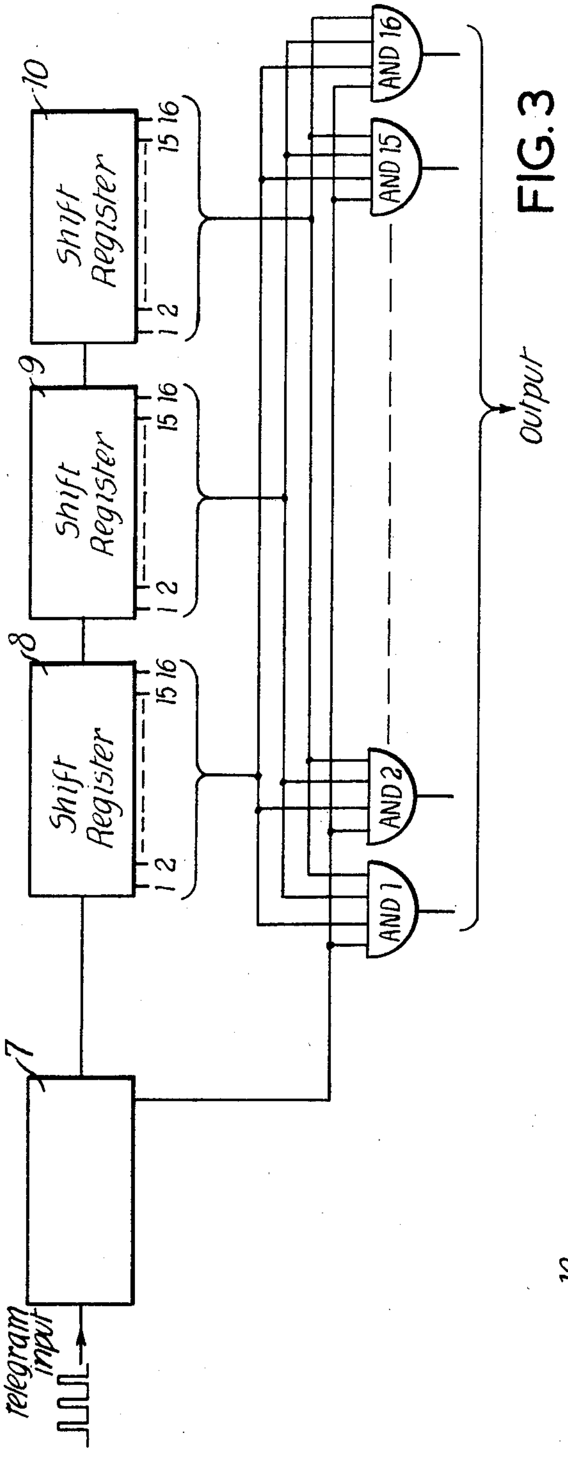
FIG. 3 is a block circuit diagram of the checking equipment.

Referring to FIG. 3 which shows the telegram checking equipment 6, the digital telegram is passed from receiver 5 into a synchronization and parity checking unit 7 and thence into three serially connected shift registers 8, 9 and 10.

The shift registers 8, 9 and 10 may each comprise in known manner a series of flip-flops or other bistable arrangements each stage, i.e. each flip-flop, having a respective output.

The synchronization and parity checking by unit 7 can be performed in a number of ways using known logic circuit techniques.

In an alternative system individual synchronization and parity checking units may be associated with each of the shift registers 8, 9 and 10. Thus a synchronization and parity checking unit corresponding to unit 7 would be provided between shift registers 8 and 9 and between shift registers 9 and 10. This will give a higher degree of security that when just the one unit is used.

The shift registers 8 to 10 each have sixteen stages corresponding to the number of information bits in the telegram and each stage has a respective output terminal. The output terminals are referenced 1 to 16. The corresponding outputs of the shift registers are connected in parallel to logic AND units referenced AND 1 to AND 16 which also have an input from the unit 7. Thus each of the terminals No. 1 of the shift registers 8 to 10 are connected to AND 1 and so on up to the terminals No. 16 which are connected to AND 16. Therefore providing that synchronization and parity are correct so that an input is provided to the AND units from the unit 7 and corresponding outputs are at the time of synchronization and parity check out simultaneously provided on the corresponding terminals of the shift registers 8 to 10 indicating that three sequentially transmitted telegrams are checking correctly against each other, the AND units will provide information outputs.

Assuming the convention that a 1 is represented by a positive going pulse at the output of an AND unit which constitutes a command signal and 0 is represented by no pulse and thus no command signal, a 1 output from an AND unit continually reproduced by the repeated telegram transmissions will be represented by a train of narrow pulses as indicated at 12 in FIG. 4.

In order to provide a usable output signal representing the 1 command signals each of the output terminals of the AND units are connected to a respective A-C only circuit shown in FIG. 4. These circuits receive as their inputs the narrow pulses shown at 12 constituting the 1 command bits of the telegram. The pulses are passed through a divide by two circuit 13 to produce a square wave output as shown at 14 which is fed to the primary winding of transformer 15, the secondary winding of which is connected to control equipment which may be for example a relay or a lamp (not shown). During normal operation the secondary winding of the transformer 15 when receiving a 1 command signal will have a voltage induced across it from the square wave input. If the system sticks, e.g. if one of the AND gates should malfunction so as to provide a continuous output regardless of the signals applied to its input a D.C. voltage or zero voltage will be produced across the transformer primary winding, the secondary winding will have no output voltage, and the control equipment will be caused to fail to a safe condition.

Advantageously the checking equipment as described above can be used to receive the input from the telegram transmitting arrangement described in copending U.S. application Ser. No. 188,065 filed Oct. 12, 1971.

I claim:

1. In a communication system in which information is conveyed in digital code in the form of a repeatedly transmitted multi-digital telegram, checking equipment through which the successive telegrams are passed sequentially at a receiving station, said checking equipment comprising a plurality of serially connected shift registers each having a number of stages with respective outputs corresponding to the number of information bits of the digital telegram so that each stage of one said shift register and the corresponding stage of another said shift register produce outputs related to the corresponding information bits of sequentially transmitted multidigital telegrams, and a plurality of logic circuit elements equal in number to the number of stages in each of said shift registers, each of said logic circuit elements having inputs connected to each of the corresponding outputs of the shift registers, said logic circuit elements including means responsive to a disparity between corresponding outputs from said plural shift registers respectively to prevent passing of the corresponding information bit of the track telegram beyond the checking equipment.

2. Checking equipment as claimed in claim 1, wherein at least one synchronization and parity checking unit is connected in series with said shift registers and provides an input to each of said logic circuit elements.

3. Checking equipment as claimed in claim 1 and embodying an A.C-only device comprising a transformer whose A.C. input is derived from electric pulses constituting the outputs of said logic circuit elements, such that if the checking equipment sticks, there is no output from the transformer.

4. Checking equipment as claimed in claim 3, wherein the output of each of said logic circuit elements is connected to a respective "A-C only" device.

5. Checking equipment as claimed in claim 3 wherein the output of each said logic circuit element is connected to a respective A-C only device through a divide by two circuit.

* * * * *